US007865667B2

(12) United States Patent
Kohn et al.

(10) Patent No.: US 7,865,667 B2
(45) Date of Patent: *Jan. 4, 2011

(54) MULTI-CORE MULTI-THREAD PROCESSOR (75) Inventors: Leslie D. Kohn, Fremont, CA (US);
Kunle A. Olukotun, Stanford, CA (US);
Michael K. Wong, San Mateo, CA (US)

(73) Assignee: Oracle America, Inc., Redwood City, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/686,317

(22) Filed: Mar. 14, 2007

(65) Prior Publication Data
US 2007/0162911 A1 Jul. 12, 2007

Related U.S. Application Data (63) Continuation of application No. 10/272,786, filed on Oct. 16, 2002, now Pat. No. 7,209,996.

(60) Provisional application No. 60/345,315, filed on Oct. 22, 2001.

(51) Int. Cl.
G06F 13/00 (2006.01)
(52) U.S. Cl. ............... 711/119; 711/113; 711/E12.021

(58) Field of Classification Search ................. 711/119, 711/E12.021; 710/305, 306, 317, 52
See application file for complete search history.

(56) References Cited

U.S. PATENT DOCUMENTS 6,341,347 B1 * 1/2002 Joy et al. .............. 712/228
2002/0087803 A1 * 7/2002 Jones et al. ............ 711/138

* cited by examiner

Primary Examiner—Reginald G Bragdon
Assistant Examiner—Victor W Wang
(74) Attorney, Agent, or Firm—Martine Penilla & Gencarella, LLP (57) ABSTRACT In one embodiment, a processor is provided. The processor includes at least two cores, where each of the cores include a first level cache memory. Each of the cores are multi-threaded. In another embodiment, each of the cores includes four threads. In another embodiment a crossbar is included. A plurality of cache bank memories in communication with the at cores through the crossbar is provided. Each of the plurality of cache bank memories are in communication with a main memory interface. In another embodiment a buffer switch core in communication with each of the plurality of cache bank memories is also included. A server and a method for optimizing the utilization of a multithreaded processor core are also provided.

3 Claims, 8 Drawing Sheets

MULTI-CORE MULTI-THREAD PROCESSOR

CROSS REFERENCE TO RELATED APPLICATIONS

This application is a continuation application of U.S. patent application Ser. No. 10/272,786 filed on Oct. 16, 2002, now U.S. Pat. No. 7,209,996, which claims priority from U.S. Provisional Patent Application No. 60/345,315 filed Oct. 22, 2001, issued Apr. 24, 2007, and entitled "High Performance Web Server". The disclosures of these related applications are incorporated herein by reference.

BACKGROUND OF THE INVENTION

1. Field of the Invention

This invention relates generally to servers and more particularly to a processor architecture and method for serving data to client computers over a network.

2. Description of the Related Art

With the networking explosion brought along with introduction of the Internet, there has been an increasing number of server applications that have multiple threads for serving multiple clients. Electronic commerce has created a need for large enterprises to serve potentially millions of customers. In order to support this overwhelming demand, the serving applications have different memory characteristics than the memory characteristics for desktop applications. In particular, the serving applications require large main memory bandwidth and have relatively poor cache behavior in order to accommodate a large number of clients.

In addition, conventional processors focus on instruction level parallelism to increase performance. Therefore, the processors tend to be very large and the pipeline is very complex. Consequently, due to the complexity of the pipeline for processors, such as INTEL processors, only one core is on the die. Accordingly, when there is a cache miss to main memory or some other long latency event, such as branch miss prediction, there is usually a stall that causes the pipeline to sit idle. As a result, serving applications which have large memory footprints and poor cache locality and branch predictability tend to have very little instruction level parallelism per thread. Thus, the characteristics of implementation for conventional processors with the application of server workloads result in a poor hardware utilization and unnecessary power dissipation since conventional processors focus on instruction level parallelism.

Figure 1:
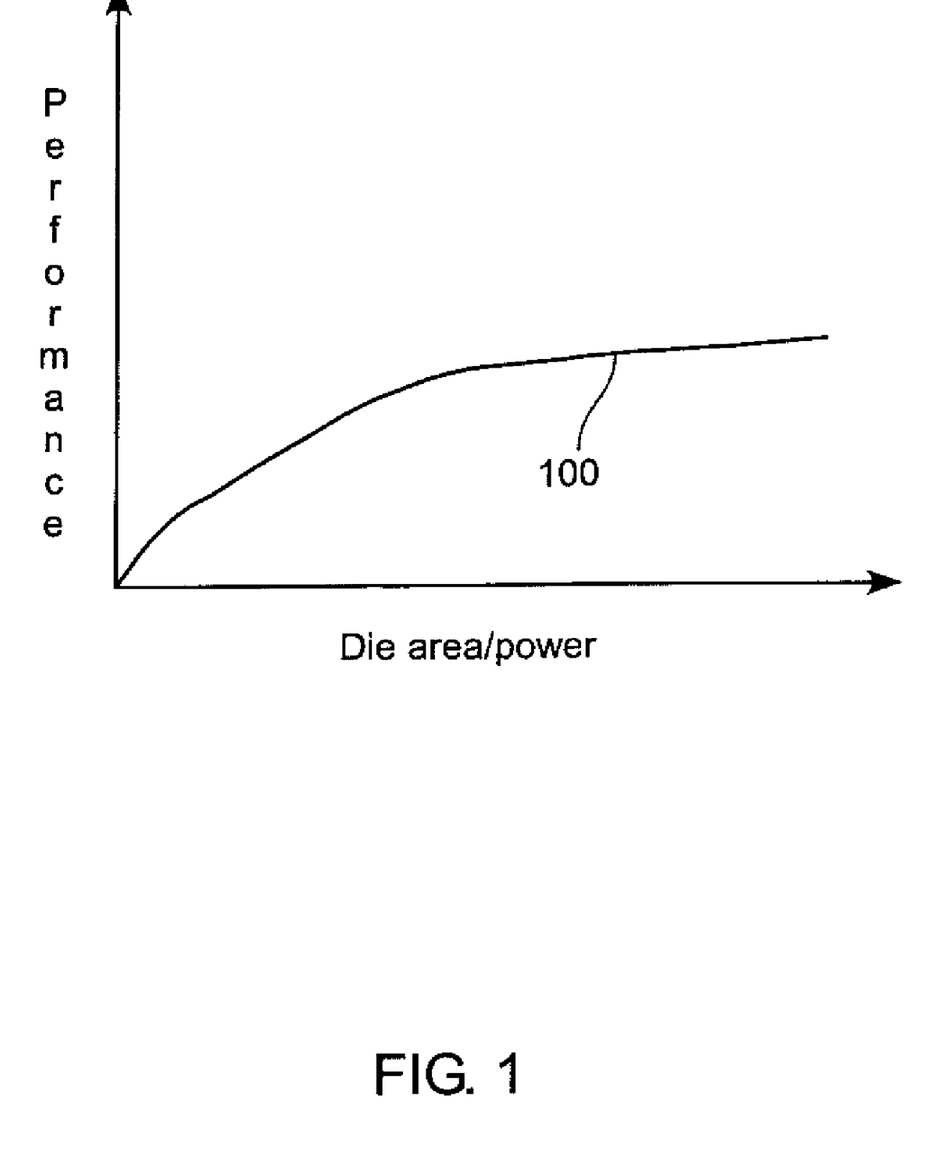
FIG. 1 is a graph depicting the relationship between the performance and the power/size of conventional processors based upon instruction level parallelism.

Additionally, the performance of processors based on instruction level parallelism, as a function of die size, power and complexity, is reaching a saturation point. FIG. 1 is a graph depicting the relationship between the performance and the power/size of conventional processors based upon instruction level parallelism. As illustrated by line 100 of FIG. 1, the increase in power and size of conventional processors does not provide a simultaneous linear increase in performance, due to the constraints of the instruction level parallelism (ILP) architecture. Conventional ILP processors include well known processors from the PENTIUM™, ITANIUM™, POWER™, ULTRASPARC™, etc., families.

In view of the forgoing, there is a need for a processor having an architecture better suited for serving applications in which the architecture is configured to exploit multi-thread characteristics of serving applications.

SUMMARY OF THE INVENTION

Broadly speaking, the present invention fills these needs by providing a processor having an architecture configured to efficiently process server applications. It should be appreciated that the present invention can be implemented in numerous ways, including as an apparatus, a system, a device, or a method. Several inventive embodiments of the present invention are described below.

In one embodiment, a processor is provided. The processor includes at least two cores, where each of the cores include a first level cache memory. Each of the cores are multithreaded. In another embodiment, each of the cores includes four threads. A crossbar is included. A plurality of second level cache bank memories in communication with the cores through the crossbar are provided. Each of the plurality of level 2 cache bank memories are in communication with a main memory interface. A buffer switch core in communication with each of the plurality of cache bank memories is also included.

In another embodiment, a server is provided. The server includes an application processor chip. The application processor chip includes a plurality of multithreaded central processing unit cores. Each of the plurality of multithreaded central processing unit cores includes a first level cache memory. The application processor chip includes a crossbar and a plurality of cache bank memories in communication with the cores through the crossbar. Each of the plurality of second level cache bank memories is in communication with a main memory interface. The application processor chip includes a buffer switch core in communication with each of the plurality of cache bank memories.

In yet another embodiment, a method for optimizing utilization of a multithreaded processor core is provided. The method initiates with the method operation of accessing a processor core through a first thread operation. Then, after the first thread operation has completed accessing the processor core, a long latency operation is performed through the first thread. Next, the first thread is suspended. Then, a second thread operation ready to access the processor core is identified and selected. The second thread operation is processed through the processor core while the first thread performs the long latency operation in the background.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for improving throughput and efficiency of processors running commercial application workloads. It will be obvious, however, to one skilled in the art, that the present invention may be practiced without some or all of these specific details. In other instances, well known process operations have not been described in detail in order not to unnecessarily obscure the present invention. The term about as used herein refers to a range of +/−10% of the corresponding value.

The embodiments described herein have multiple simple cores on a chip, where each of the cores have their own first level cache and the cores share a second level cache through a crossbar. Additionally, each of the cores have two or more threads. Through multi-threading, latencies due to memory loads, cache misses, branches, and other long latency events are hidden. In one embodiment, long latency instructions cause a thread to be suspended until the result of that instruction is ready. One of the remaining ready to run threads on the core is then selected for execution on the next clock (without introducing context switch overhead) into the pipeline. In one embodiment, a scheduling algorithm selects among the ready to run threads at each core. Thus, a high throughput architecture is achieved since the long latency event is performed in the background and the use of the central processing unit is optimized by the multiple threads.

Figure 2:
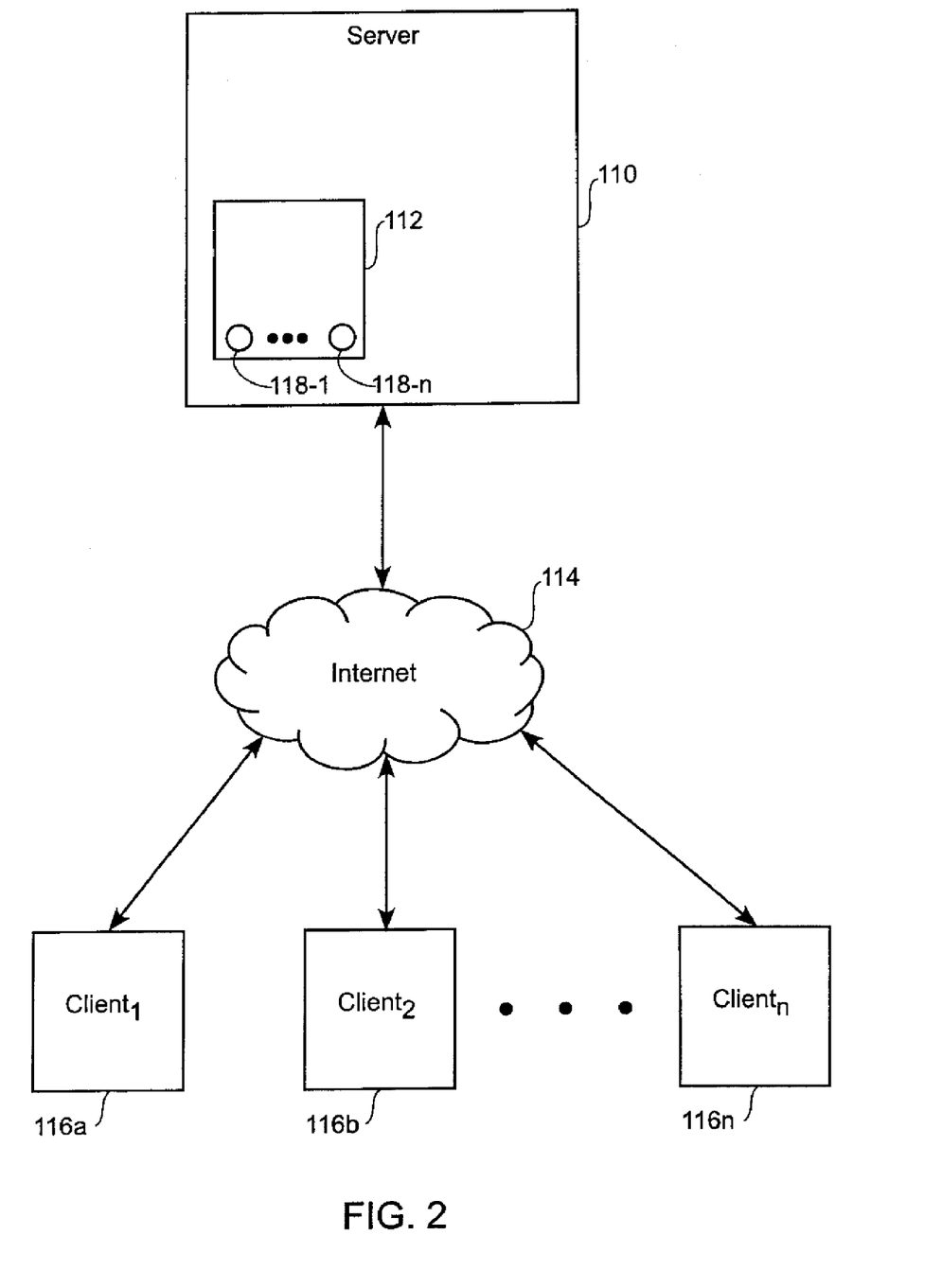
FIG. 2 is a high level simplified schematic diagram of a server with a processor having an architecture based upon thread level parallelism (TLP) in accordance with one embodiment of the invention.

FIG. 2 is a high level simplified schematic diagram of a server with a processor having an architecture based upon thread level parallelism (TLP) in accordance with one embodiment of the invention. Server 110 includes processor 112, e.g., a central processing unit (CPU). Processor 112 includes multiple cores on a chip where each of the multiple cores has two or more threads, as will be explained in more detail below. Server 110 is in communication with a distributed network, such as Internet 114, enabling server 110 to communicate with clients 1-n 116a-116n. In one embodiment, server 110 is a server for a commercial application, e.g., an application server application, database application, etc.

Figure 3:
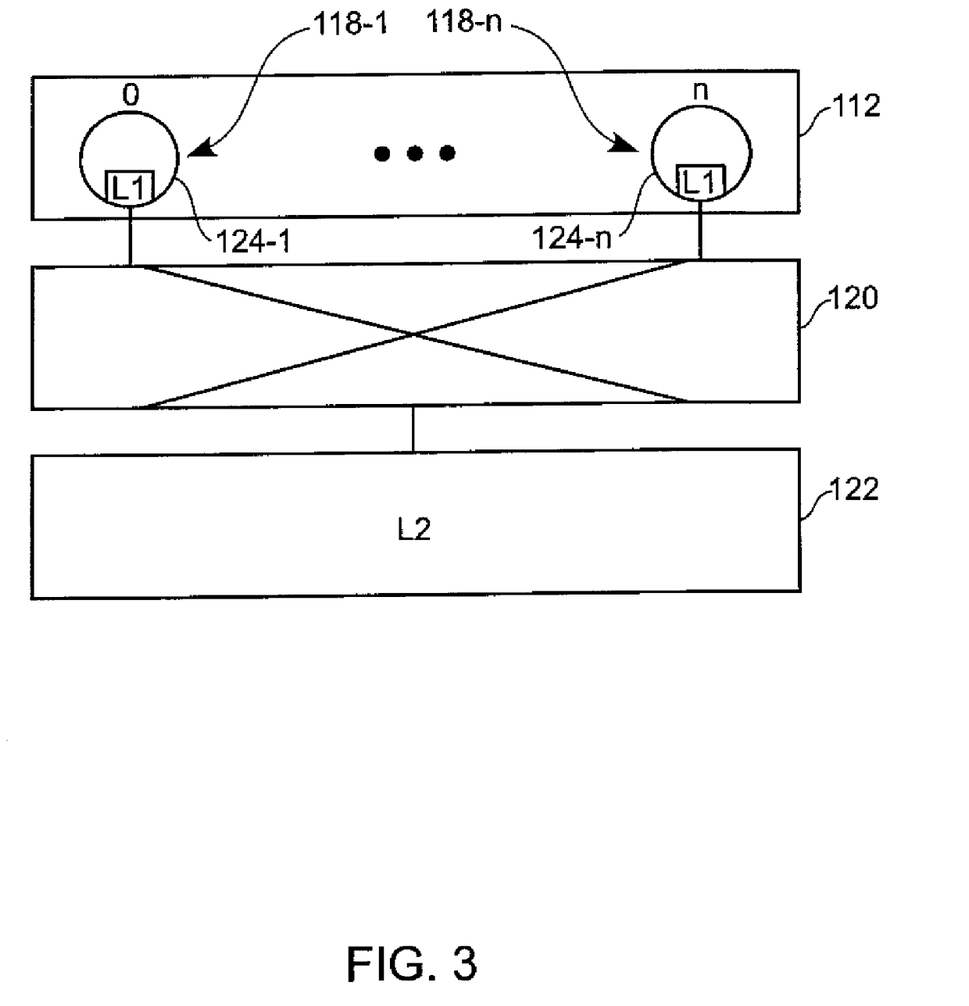
FIG. 3 is a simplified schematic diagram of a processor chip having multiple processing cores with multiple threads, wherein each core contains a first level cache and the multiple cores share a second level cache in accordance with one embodiment of the invention.

FIG. 3 is a simplified schematic diagram of a processor chip having multiple processing cores with multiple threads, wherein each core contains a first level cache and the multiple cores share a second level cache in accordance with one embodiment of the invention. Processor chip 112 includes processor cores 0 through n, 118-1 through 118-n. In one embodiment, processor chip 112 includes 8 processor cores, however, it should be appreciated that the invention is not limited to 8 processor cores. Each of processor cores 118-1 through 118-n include a first level cache 124-1 through 124-n, respectively. Each of the cores share second level cache 122 through crossbar 120. Crossbar 120 enables communication between processor cores 118-1 through 118-n and second level cache 122. In one embodiment, crossbar 120 is configured to accommodate a large number of independent accesses that are processed on each clock cycle.

Figure 4:
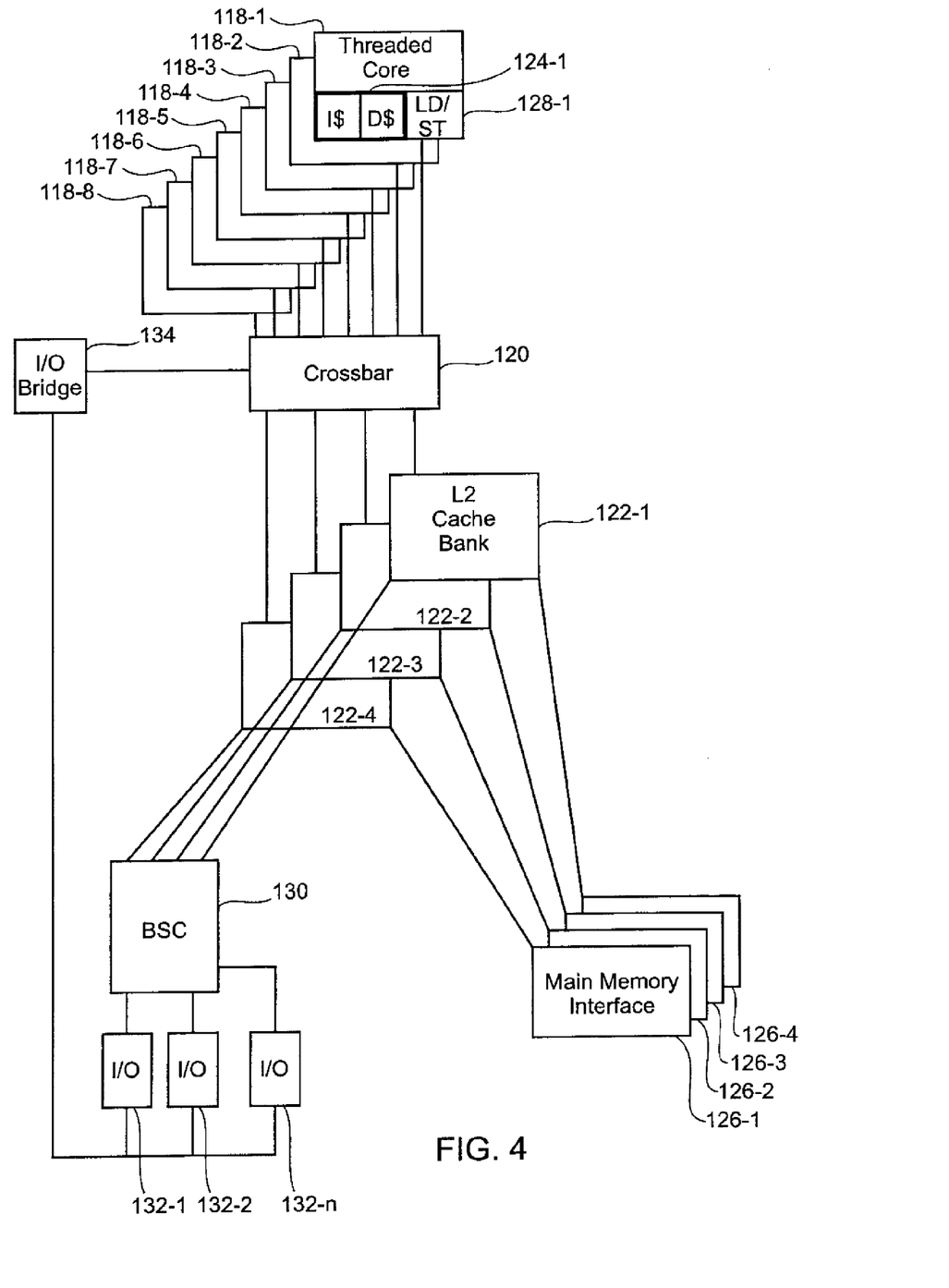
FIG. 4 is a more detailed schematic diagram of a processor chip having 8 multithreaded processor cores in accordance with one embodiment of the invention.

FIG. 4 is a more detailed schematic diagram of a processor chip having 8 multithreaded processor cores in accordance with one embodiment of the invention. Threaded cores 118-1 through 118-8 include level 1 cache 124-1 through 124-8, respectively. Level 1 cache 124-1 includes instruction cache (I$) segment and data cache (D$) segment. Load/Store unit 128-1 is included within threaded core 118-1. It should be appreciated that each of processor cores 118-1 through 118-8 include an instruction cache, a data cache and a load store unit. In another embodiment, each of the processor cores are based upon SPARC™ V9 architecture of the assignee of the invention. Each processor core 118-1 through 118-8 is in communication with crossbar 120. Crossbar 120 is optimized for processor traffic where it is desirable to obtain extremely low latency. Level 2 (L2) cache banks 122-1 through 122-4 are shared by processor cores 118-1 through 118-8. It should be appreciated that by sharing L2 cache banks 122-1 through 122-4 allows for concurrent access to multiple banks at the same time, thereby defining a high bandwidth memory system. In one embodiment, each of L2 cache banks have a size of about 1 megabyte (MB). It should be appreciated that while four L2 cache banks 122-1 through 122-4 are shown in FIG. 4, the invention is not limited to four L2 cache banks. That is, the number of L2 cache banks is sufficient to provide enough bandwidth from the L2 cache to keep all of the cores busy most of the time. In one embodiment, each processor core includes 4 threads. Thus, a single processor chip with eight cores will have 32 threads in this configuration. Each L2 cache bank 122-1 through 122-4 is in communication with main memory interface 126-1 through 126-4 to provide access to the main memory. It should be appreciated that while 8 cores are depicted on the processor chip, more or less cores can be included as FIG. 4 is exemplary and not meant to be limiting. It will be apparent to one skilled in the art that the functions provided by the interconnect structure, i.e., crossbar 120 and buffer switch core 130, can be provided through equivalent structures suitable for processing signals between cache banks 122-1 through 122-4, processing cores 118-1 through 118-8 and I/O devices 132-1 through 132-n and known in the art.

Still referring to FIG. 4, buffer switch core (BSC) 130 is a block that is optimized to provide maximum bandwidth to the main memory for I/O direct memory access (DMA) transactions. In one embodiment, the switch structure of BSC 130 can act as a DMA traffic switch configured to handle a number of ports due to the different I/O devices and I/O interfaces communicating with BSC 130. In another embodiment, BSC 130 is enabled to perform memory queuing. BSC 130 includes circuitry configured to communicate with a variety of different I/O interfaces through I/O ports and buffer the DMA traffic generated by the I/O devices. The buffered signals are queued and then transmitted into L2 cache banks 122-1 through 122-4. In turn, L2 cache banks 122-1 through 122-4 maintain the coherency between the data in the L2 cache banks and the corresponding data in the main memory.

In one embodiment, the pathway that includes BCS 130 L2 cache banks 122-1 through 122-4 and main memory interface 126-1 through 126-4, of FIG. 4, is used to perform direct memory access (DMA) transfers between I/O device 132-1 through 132-n and the main memory. For control register accesses to the I/O devices, an additional port on crossbar 120 is in communication with I/O bridge 134, which in turn is in communication with I/O devices 132-1 through 132-n. Thus, processor cores 118-1 through 118-8 are enabled to directly access a register in any of I/O devices 132-1 through 132-*n* instead of communicating through the memory. For example, one of processor cores 118-1 through 118-8 may transmit a load instruction to crossbar 120. Crossbar 120 then transmits the signal to I/O bridge 134 rather than L2 cache banks 122-1 through 122-4. I/O bridge 134 then generates a transaction to corresponding I/O device 132-1 through 132-*n* to obtain the necessary data. Once the data has been received by I/O bridge 134, the data is transmitted back to crossbar 120 and subsequently to respective processor core 118-1 through 118-8. Accordingly, any one of processor cores 118-1 through 118-8, or any of the threads of the processor cores, can access I/O devices 132-1 through 132-*n* while bypassing L2 cache banks 122-1 through 122-4 for the programming of the I/O device for DMA transfers. It will be apparent to one skilled in the art that prior to performing DMA transfers, certain parameters must be set up in I/O devices 132-1 through 132-*n*. Exemplary parameters set up in I/O devices 132-1 through 132-*n* include transfer lengths, transfer addresses, and number of transfers, etc. In one embodiment, I/O bridge 134 processes control signals, e.g. commands setting up control signals and reading a status. Thus, the pathway between I/O devices 132-1 through 132-*n*, I/O bridge 134 and crossbar 120 define a control path. The pathway defined between crossbar 120 cache banks 122-1 through 122-4, BSC 130 and main memory interface 126-1 through 126-4 defines a data pathway.

Figure 5:
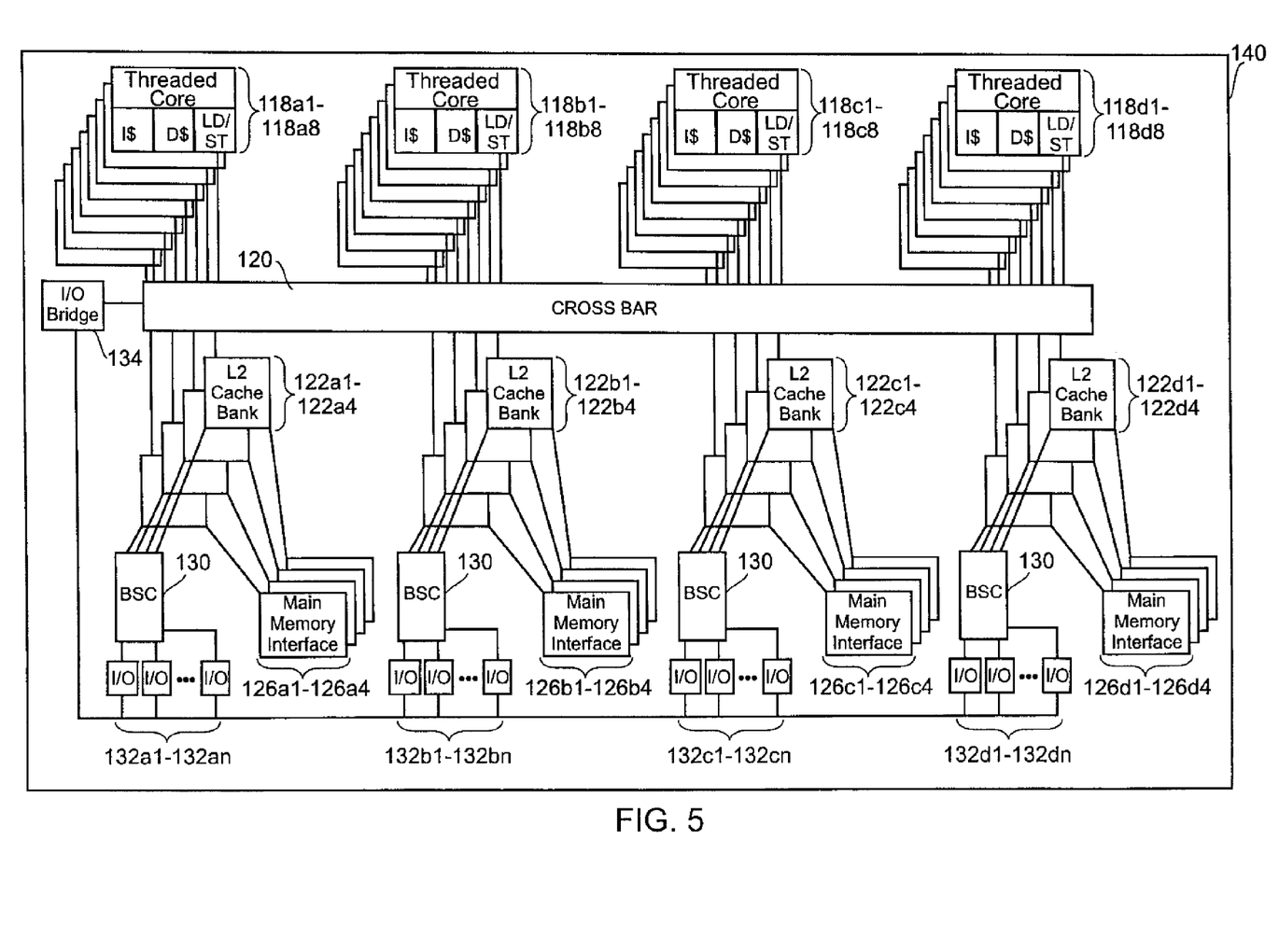
FIG. 5 is schematic diagram of a processor chip having 32 multithreaded processor cores in accordance with one embodiment of the invention.

FIG. 5 is schematic diagram of a processor chip having 32 multithreaded processor cores in accordance with one embodiment of the invention. Here, 4 sets processor cores 118*a*1-118*a*8, 118*b*1-118*b*8, 118*c*1-118*c*8 and 118*d*1-118*d*8 are provided on processor chip 140. Each of the four sets contain 8 processor cores. In one embodiment, each of the processor cores include four threads, therefore, processor chip 140 includes a total of 128 threads in this embodiment. Of course, more or less threads can be included per processor core and more or less processor cores can be included on the processor chip. As mentioned above with reference to FIG. 4, data pathways for each of the sets of processor cores is defined through crossbar 120, respective L2 cache banks 122*a*1-122*a*4, 122*b*1-122*b*4, 122*c*1-122*c*4 and 122*d*1-122*d*4, buffer switch core (BSC) 130, and respective main memory interface 126*a*1-126*a*4, 126*b*1-126*b*4, 126*c*1-126*c*4 and 126*d*1-126*d*4. It should be appreciated that BSC 130 is shown four times due to illustration limitations. That is, there is a single BSC 130 connecting all of I/O devices 132*a*1-132*a**n*, 132*b*1-132*b**n*, 132*c*1-132*c**n* and 132*d*1-132*d**n* to each of second level cache banks 122*a*1-122*a*4, 122*b*1-122*b*4, 122*c*1-122*c*4 and 122*d*1-122*d*4. Likewise control pathways for each of the sets of processor cores are defined through crossbar 120, I/O bridge 134, and respective I/O device 132*a*1-132*a**n*, 132*b*1-132*b**n*, 132*c*1-132*c**n* and 132*d*1-132*d**n*. As will be explained in more detail below, the power and die size versus performance tradeoff is optimized for each processor core through a single issue pipeline using in order execution. Thus, the performance is increased by providing multiple simple cores with multiple threads, wherein the thread level parallelism, in conjunction with a simplified pipeline, enables the processor chip to fit on a smaller die that consumes less power than a conventional processor based upon instruction level parallelism.

Figure 6:
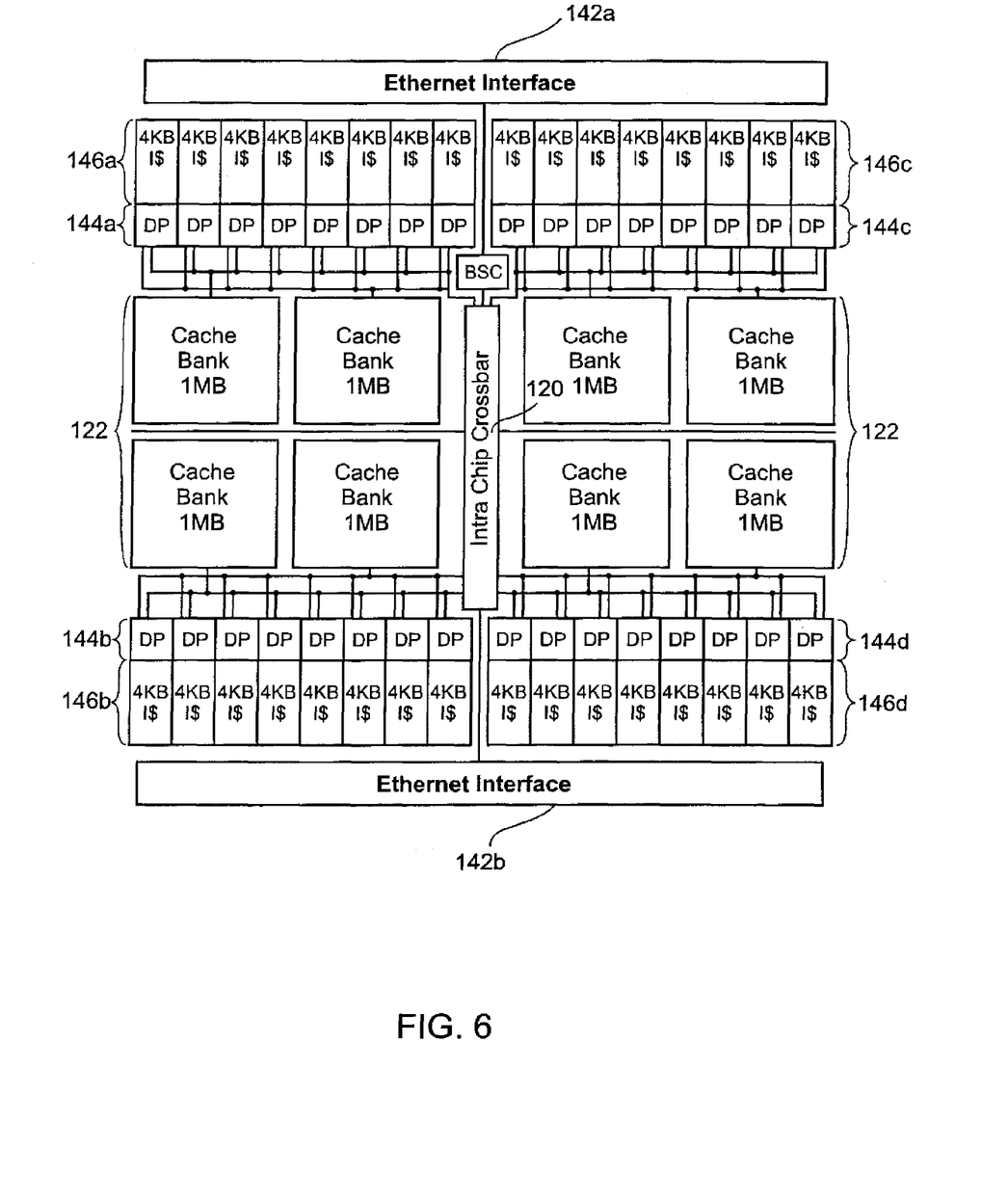
FIG. 6 is an alternative schematic representation of the processor chip of FIG. 5.

FIG. 6 is an alternative schematic representation of the processor chip of FIG. 5. Here, crossbar 120 is in communication with data pathways 144*a*-144*d*, BSC 130 and L2 cache banks 122. It should be appreciated that only 2 sets of cache banks 122 are shown due to limitations of illustrating this configuration in two dimensions. Two additional cache banks are provided, but not shown, so that each data pathway 144*a*-144*d* is associated with a cache bank. Ethernet interfaces 142*a* and 142*b* provide access to a distributed network. In one embodiment, Ethernet interfaces 142*a* and 142*b* are gigabit Ethernet interfaces. Level one cache memories 146*a*-146*d* are provided for each of the processor cores associated with data pathways 144*a*-144*d*.

Figure 7:
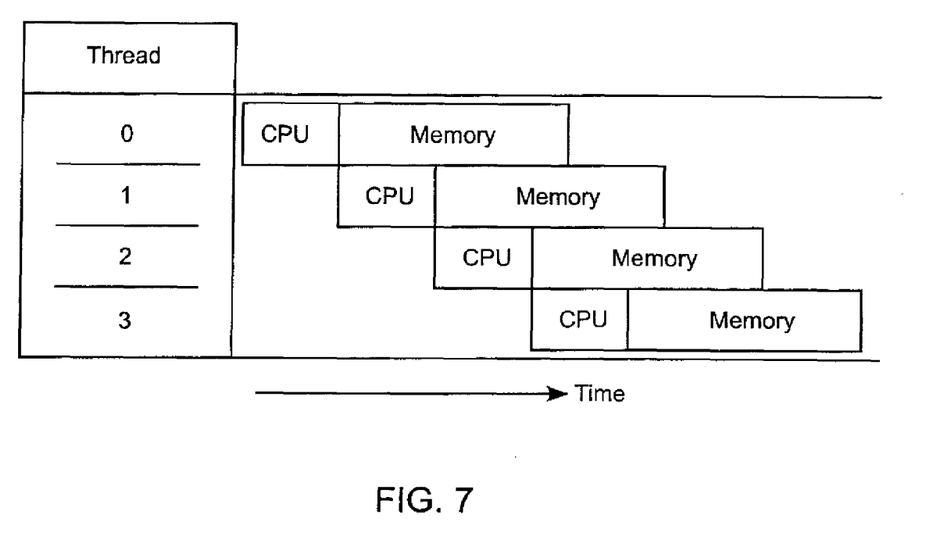
FIG. 7 is a graphical representation of the pipeline utilization for a processor core having four threads in accordance with one embodiment of the invention.

FIG. 7 is a graphical representation of a high throughput architecture for a processor core having four threads in accordance with one embodiment of the invention. Thread 0 utilizes the central processing unit (CPU) and then is active in memory. For example, a long latency event may cause the thread to be active in memory. While thread 0 is active in memory, thread 1 accesses the CPU and so on for each of threads 3 and 4. It should be appreciated that the operation of thread 0 being active in memory is performed in the background. Furthermore, since the memory system described herein is a parallel memory system, multiple references can occur simultaneously. Thus, the use of the CPU is optimized per core in a staggered technique. The pipeline is less complex, i.e., a single issue pipeline without instruction level parallelism, and can be replicated a number of times in the same area as a conventional instruction level parallelism pipeline. In essence, the pipeline overlaps the execution of multiple threads to maximize CPU pipeline utilization.

Figure 8:
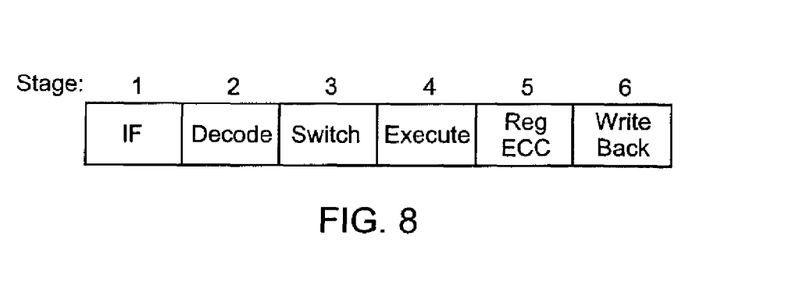
FIG. 8 is a simplified schematic diagram of the pipeline stages for a single issue in order pipeline executed within a thread in accordance with one embodiment of the invention.

FIG. 8 is a simplified schematic diagram of the pipeline stages for a single issue in order pipeline executed within a thread in accordance with one embodiment of the invention. The first stage of the pipeline is the instruction fetch where an instruction is obtained. The second stage of the pipeline is the decode stage, also referred to as a register fetch stage, where the instruction opcode, operand source/destination, and control signals are decoded. The third stage is the switch stage, where the selection of a thread to dispatch to the execute stage, which is the fourth stage of the pipeline, is performed each clock cycle. It should be appreciated that where the processor cores have four threads, as mentioned above, four threads of hardware are present for stages 1-3. In one embodiment, the effective address is calculated for load and store instructions in stage 4. In another embodiment, all through stages 1-6, there is one instruction being processed at any one stage, i.e. the pipeline is a single issue pipeline, as opposed to conventional ILP processors where more than one instruction may exist at the corresponding stages. Stage 5 is a register error code correction stage while stage 6 is the write back stage where the results of a particular thread are written to a register file.

Figure 9:
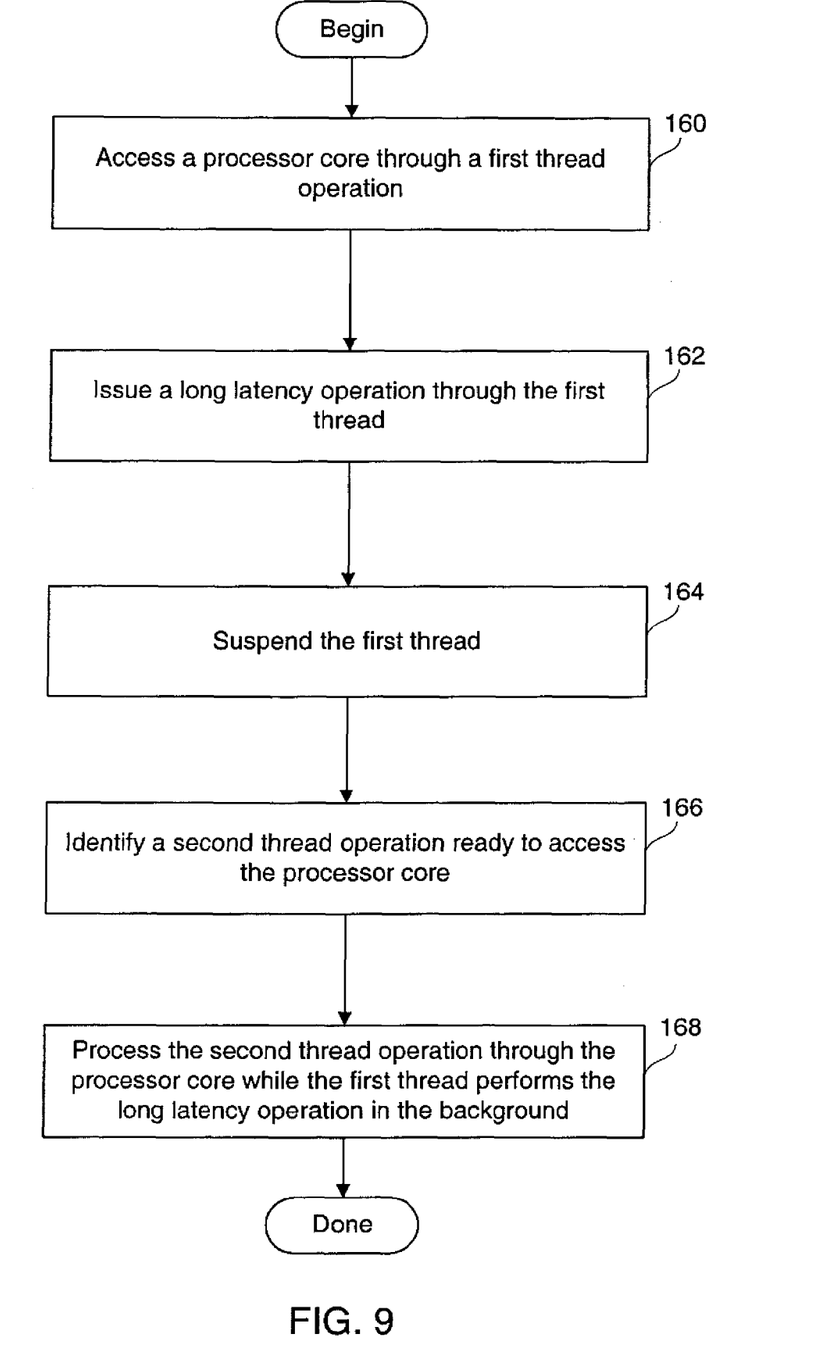
FIG. 9 is a flowchart diagram of the method operations for optimizing utilization of a multithreaded processor core in accordance with one embodiment of the invention.

FIG. 9 is a flowchart diagram of the method operations for optimizing utilization of a multithreaded processor core in accordance with one embodiment of the invention. The method initiates with operation 160 where a processor core is accessed through a first thread operation. It should be appreciated that the processor core is a multithreaded core having at least two threads as described above. The method then advances to operation 162 where after the first thread operation has completed accessing the processor core, a long latency operation is performed. For example, the thread may be active in memory as discussed with reference to FIG. 7. The long latency operation includes a cache miss, a branch, and a floating point operation. The method then proceeds to operation 164 where the first thread is suspended. As mentioned with reference to FIG. 7, the first thread while active in memory is running in the background. The method then moves to operation 166 where a second thread operation that is ready to access the processor core is identified. As mentioned with reference to FIG. 8, the second thread operation is identified and selected at the switch stage of the pipeline. In one embodiment, a scheduling algorithm is used to select the second thread. The method then advances to operation 168 where the second thread operation is processed by the processor core while the long latency operation associated with the first thread is executed in the background, e.g. active in memory. Of course, multiple instructions may be dispatched from the second thread until the long latency instruction of the first thread is completed. Accordingly, multiple threads are overlapped to maximize pipeline usage.

In summary, the above described embodiments provide multiple cores on a chip where each of the cores have at least two threads. The multithreaded multiple cores define a high throughput architecture configured to efficiently support a server application capable of serving a number of clients. Additionally, the architecture exploits the multiple threads of a server application. In one embodiment, the architecture of the processor cores are simplified due to the thread level parallelism and the simplified pipeline, i.e., single issue pipeline.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processor, comprising:
    at least two cores, each of the at least two cores having a first level cache memory, each of the at least two cores being multi-threaded;
    a buffer switch core in communication with a plurality of cache bank memories, the buffer switch core configured to communicate with multiple input/output (I/O) interfaces;
    an input/output bridge in communication with a crossbar and external input/output devices, the input/output bridge enabling control register transfers with external input/output devices; and
    the plurality of cache bank memories in communication with the at least two cores, each of the plurality of cache bank memories in communication with a main memory interface, wherein the processor includes an interconnect structure that includes the crossbar in communication with each of the plurality of cache bank memories and the at least two cores and wherein a pathway through the input output bridge bypasses the plurality of cache bank memories.

2. The processor of claim 1, wherein the buffer switch core enables direct memory accesses into registers of external input/output devices.

3. The processor of claim 1, wherein each thread associated with the at least two cores is configured to run on a single issue pipeline.

* * * * *